US012573570B2

(12) United States Patent
Seagren et al.

(10) Patent No.: US 12,573,570 B2
(45) Date of Patent: Mar. 10, 2026

(54) HIGH VOLTAGE DC CONTACTOR ISOLATION VIA ELECTROMECHANICAL ACTUATION

(71) Applicant: Hamilton Sundstrand Corporation, Charlotte, NC (US)

(72) Inventors: Robert L. Seagren, Rockford, IL (US); Alex Gomes, Chicago, IL (US); Joshua C. Swenson, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 183 days.

(21) Appl. No.: 18/479,349

(22) Filed: Oct. 2, 2023

(65) Prior Publication Data

US 2025/0112011 A1 Apr. 3, 2025

(51) Int. Cl.
*H01H 33/06* (2006.01)
*H01H 33/04* (2006.01)
*H01H 33/26* (2006.01)
*H01H 33/42* (2006.01)
*H01H 33/664* (2006.01)

(52) U.S. Cl.
CPC ............ *H01H 33/06* (2013.01); *H01H 33/26* (2013.01); *H01H 33/6641* (2013.01); *H01H 33/045* (2013.01); *H01H 2033/426* (2013.01)

(58) Field of Classification Search
CPC .... H01H 33/06; H01H 33/26; H01H 33/6641; H01H 33/045; H01H 2033/426; H01H 9/32; H01H 9/548; H01H 50/021; H01H 50/546; H01H 33/596
USPC .............................................................. 361/2
See application file for complete search history.

(56) References Cited

U.S. PATENT DOCUMENTS

| | | | | |
|---|---|---|---|---|
| 7,916,437 | B2 | 3/2011 | Hardesty et al. | |
| 11,527,878 | B2 | 12/2022 | Zhou et al. | |
| 2008/0143462 | A1* | 6/2008 | Belisle | H01H 9/542<br>335/201 |
| 2022/0351926 | A1* | 11/2022 | Potter | H01H 33/182 |

FOREIGN PATENT DOCUMENTS

| | | | | |
|---|---|---|---|---|
| CN | 108269708 A | * 7/2018 | H01H 9/32 |
| EP | 2784795 A1 | * 10/2014 | H01H 9/32 |
| JP | 2010257953 A | * 11/2010 | |

OTHER PUBLICATIONS

European Search Report for Application No. 24200870.4, mailed Jan. 30, 2025, 14 pages.

* cited by examiner

*Primary Examiner* — Sreeya Sreevatsa
(74) *Attorney, Agent, or Firm* — CANTOR COLBURN LLP

(57) ABSTRACT

A high voltage DC contactor control system. The system reduces/eliminates arcing in in contactors and includes a short circuit protection system operably connected to the drive voltage configured to reducing arcing between portions of the contactor. The short circuit protection system includes a first arc prevention element and a first arc prevention driver configured to cause the first arc prevention element to be disposed between the first and second portions of the first contactor to prevent arcing between them.

14 Claims, 9 Drawing Sheets

HIGH VOLTAGE DC CONTACTOR ISOLATION VIA ELECTROMECHANICAL ACTUATION

BACKGROUND

The following description relates to controlling electrical contactors and, more particularly, to protecting hardware providing arc protection when opening contactors and especially during a short circuit event.

Contactor assemblies are used in electrical applications, such as aircraft power distribution systems, where power and current flow control of single or multi-phase power distribution system is required. A primary power distribution assembly typically has a panel on which several electrical contactors are mounted.

Each of the contactors is connected to an electrical bus bar and allows current to flow through the contactor and the corresponding bus bar whenever the contactor is in a closed position. The electrical power and current flow through the contactor is controlled by mechanically actuating a contact plate within the contactor such that, when current flow is desired to pass through the contactor, the contact plate is pushed into electrical contact with two leads and forms an electrical path coupling the leads and thereby allowing current to flow through it.

In aerospace electric power generation and distribution systems, electric power is provided from power sources such as generators, converters, Transformer Rectifier Units (TRUs), and batteries to load buses or between load buses via such contactors. In the event of a failure, contactors may be closed to provide power from an alternate power source or opened to prevent cascading failure effects.

These contactors may be controlled by control units such as generator control units or bus power control units. Determination for whether these contactors should be open or closed is performed in controller software or firmware based on a number of inputs such as generator voltage, bus voltage, TRU voltage, etc. pending the controller type.

In a short circuit event the controller determines that the contactors should be opened. In such a case, however, due to the short circuit, a high energy arc may be formed across the main contactors preventing isolation via the main contacts of a contactor. One approach to ensure the arc is not formed (or if it is that it is extinguished quickly) is to provided a fuse in-line with the contactor. The fuses can be traditional fuses or so-called "pyrofuses." Both types of fuses are "one-time use" devices that need to be replaced after they have been blown or otherwise activated.

BRIEF DESCRIPTION

Disclosed is mechanical contactor isolation system. The system can be used in a short circuit or any time the contactor is to be opened.

In one embodiment, a high voltage DC contactor control system that includes a first contactor configured to be connected to a positive feeder line, the first contactor being controlled by a drive voltage and having a first portion and a second portion that when contacting allow current to flow between them. The system also includes a short circuit protection system operably connected to the drive voltage configured to reducing arcing between portions of the first contactor. The short circuit protection system includes: a first arc prevention element; and a first arc prevention driver arranged to cause the first arc prevention element to be disposed between the first and second portions of the first contactor to prevent arcing between them.

In addition to one or more of the features described above, or as an alternative to any of the foregoing embodiments, the system can further include: a sensor to sense a short circuit; and a contactor controller configured to control operation of the first contactor and the short circuit protection system.

In addition to one or more of the features described above, or as an alternative to any of the foregoing embodiments, in the event of a short circuit, the contactor controller is configured to cause the first contactor to open in the event of a short circuit and to cause the short circuit protection supply system to move the first arc prevention element between the first and second portions.

In addition to one or more of the features described above, or as an alternative to any of the foregoing embodiments, first arc prevention element can begin moving at the same time as or before the first contactor begins opening.

In addition to one or more of the features described above, or as an alternative to any of the foregoing embodiments, the first contactor can be configured to be to be opened by removing the drive voltage from it and that first arc prevention element can be configured to be moved when the drive voltage is applied to the first arc prevention driver.

In addition to one or more of the features described above, or as an alternative to any of the foregoing embodiments, first arc prevention driver can be a coil.

In addition to one or more of the features described above, or as an alternative to any of the foregoing embodiments, the first arc prevention element can include a metallic portion and an insulating portion and the first arc prevention driver can be configured to electrically interact with the metallic portion to cause the insulation portion to move between the first and second portion of the contactor.

In addition to one or more of the features described above, or as an alternative to any of the foregoing embodiments, the insulating portion can be formed of a dielectric material.

In addition to one or more of the features described above, or as an alternative to any of the foregoing embodiments, the system can further include a second contactor connected to a negative feeder line, the second contactor being controlled by the drive voltage and having a first portion and a second portion that when contacting allow current to flow between them.

In addition to one or more of the features described above, or as an alternative to any of the foregoing embodiments, the short circuit protection system can further include a second arc prevention element and a second arc prevention driver configured to cause the second arc prevention element to be disposed between the first and second portions of the second contactor to prevent arcing between them.

Also disclosed is a method of controlling a DC contactor. The method can include: determining that short circuit exists on a positive feeder line; opening a first contactor connected to the positive feeder line, the first contactor being controlled by a drive voltage and having a first portion and a second portion that when contacting allow current to flow between them; and moving a first arc prevention element between the first and second portions of the first contactor to prevent arcing between them.

In addition to one or more of the features described above, or as an alternative to any of the foregoing method embodiments, the first arc prevention element can be controlled by a first arc prevention driver.

In addition to one or more of the features described above, or as an alternative to any of the foregoing method embodiments, a contactor controller can control operation of the first contactor and the first arc prevention driver based on the determination that the short circuit exists.

In addition to one or more of the features described above, or as an alternative to any of the foregoing method embodiments, the first contactor can be caused to be opened by removing the drive voltage from it and the first arc prevention element is caused to be moved when the drive voltage is applied to the first arc prevention driver.

In addition to one or more of the features described above, or as an alternative to any of the foregoing method embodiments, first arc prevention driver can be a coil.

In addition to one or more of the features described above, or as an alternative to any of the foregoing method embodiments, the first arc prevention element can include a metallic portion and an insulating portion and the first arc prevention driver electrically interacts with the metallic portion to cause the insulation portion to move between the first and second portion of the contactor.

In addition to one or more of the features described above, or as an alternative to any of the foregoing method embodiments, the insulating portion can be formed of a dielectric material.

Also disclosed is a high voltage DC contactor control system that includes a control element configured to be connected to a positive feeder line to control power through the positive feeder line. The control element can be a solid-state element (e.g., a transistor) in one embodiment. The system also includes: a short circuit protection system operably connected to a drive voltage configured to reducing arcing between portions of the first contactor. The short circuit protection system in this embodiment includes: a first contactor configured to be connected to a positive feeder line, wherein first contactor can be configured to be controlled by a drive voltage and have a first portion and a second portion that when contacting allow current to flow between them; a first arc prevention element; and a first arc prevention driver configured to cause the first arc prevention element to be disposed between the first and second portions of the first contactor to prevent arcing between them.

In addition to one or more of the features described above, or as an alternative to any of the foregoing embodiments, the system can further include a sensor to sense a short circuit and a controller configured to control operation of the control element and the short circuit protection system.

In addition to one or more of the features described above, or as an alternative to any of the foregoing embodiments, the controller be configured to cause the control element to become non-conductive in the event of a short circuit and that causes the short circuit protection supply system to move the first arc prevention element between the first and second portions in the event of a short circuit.

In addition to one or more of the features described above, or as an alternative to any of the foregoing embodiments, the first arc prevention element can begin moving as or before the first contactor begins opening.

BRIEF DESCRIPTION OF THE DRAWINGS

The following descriptions should not be considered limiting in any way. With reference to the accompanying drawings, like elements are numbered alike.

DETAILED DESCRIPTION

While the invention is further discussed below, it has been discovered that while the current fail-safes utilized in the industry may be effective, certain improvements can be made. In particular, arcing can be reduced or eliminated in all situations and in short circuit situation in particular by inserting insulated arc prevention elements either in a mechanical contactor or in a contactor that is part of.

The disclosed system can be reusable and such, the insulated arc prevention elements do not need to be replaced due to normal operation of when a short is detected.

Figure 1:
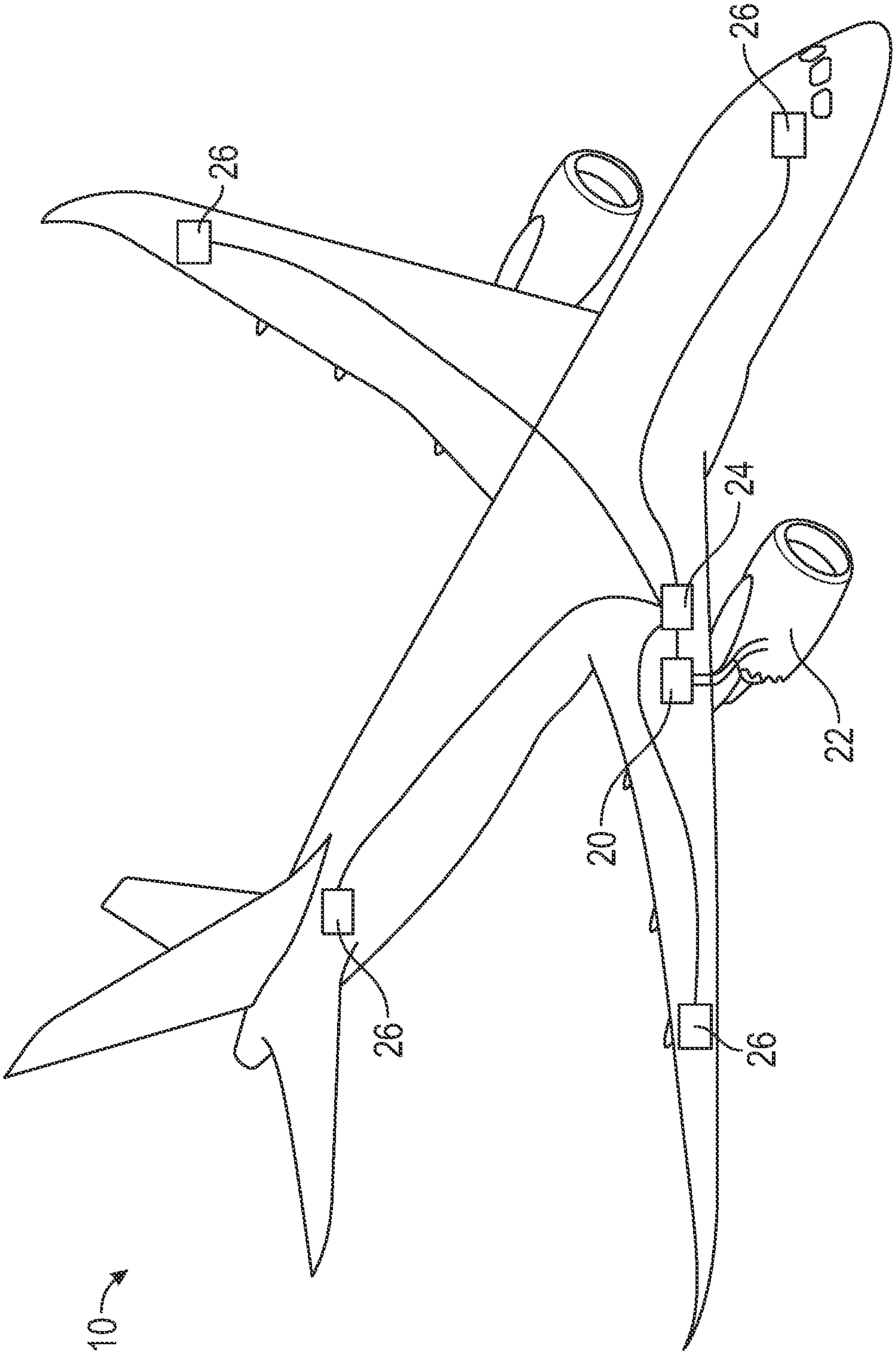
FIG. 1 is a perspective view of an aircraft in accordance with embodiments.

With reference to FIG. 1, an aircraft 10 is provided and includes an electrical power generation system 20 which utilizes rotation within the jet engines 22 to generate either single phase or three phase electrical power which is rectified produce DC power. Further, the power could be DC power that is provided by batteries, converters or fuel cells. In this example, DC power in range of 800 Vdc or more is being distributed through the system. Embodiments herein are related to contactors that are used for distributing DC power regardless of whether it is created by an AC source and rectified or it is from a DC source (e.g., battery).

The power is sent to a panel box 24 that contains multiple electrical buses and contactor assemblies for controlling how the power is distributed throughout the aircraft 10. Through the use of the contactor assemblies, power may be controlled for each onboard electrical load.

Figure 2:
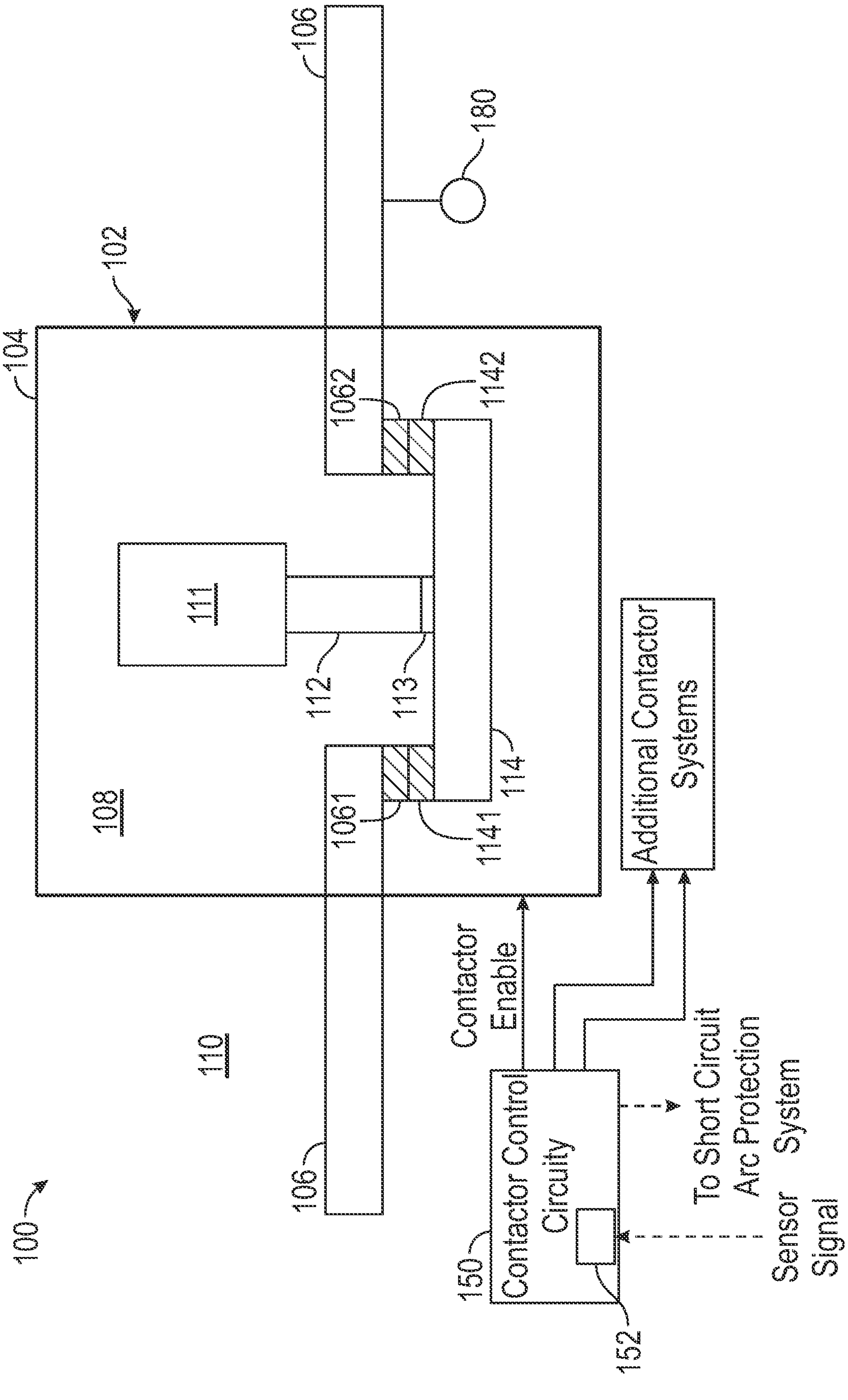
FIG. 2 is a block diagram of a contactor system that includes control circuitry with hardware contactor control/enable according to embodiments.

An exemplary panel box 24 includes multiple bus bars that can be connected to various aircraft systems by contactor assemblies (or simply contactors). Not by way of limitation but for example only, FIG. 2 shows an example of a contactor assembly 100 of panel box 24 (see FIG. 1). The contactor assembly 100 includes an electrical contactor 102 that in turn includes a housing 104 and internal bus bars 106. The housing 104 is formed to define an interior 108 and the internal bus bars 106 extend into the interior 108 from an exterior 110 of the housing 104.

The contactor assembly 100 further includes a contactor actuator 111 that can be, for example, a solenoid that includes a plunger 112 with an insulator 113 at a distal end thereof and a movable bus bar 114. At a central portion thereof, the movable bus bar 114 is coupled to the plunger 112 via the insulator 113. At opposite ends thereof, the movable bus bar 114 includes contact pads 1141 and 1142. The movable bus bar 114 is movable by the contactor actuator 111 into a first position and a second position.

At the first position, the contact pads 1141 of the movable bus bar 114 contact the stationary contact pads 1061 and 1062 such that the corresponding individual internal bus bars 106 are electrically coupled with one another. At the second position, the contact pads 1141, 1142 are displaced from the stationary contact pads 1061 and 1062 such that the corresponding internal bus bars 106 are decoupled from one another.

Thus, in operation, the electrical contactor 102 is operable in a first mode or in a second mode. In the first mode, corresponding internal bus bars 106 are electrically-coupled with each other in the interior 108 of the housing 104. In the second mode, the corresponding internal bus bars 106 are electrically decoupled from one another in the interior 108 of the housing 104.

In FIG. 2, whether or not the contactor actuator 111 moves the bus bar 114 into the first or second position is based on a contactor enable signal received from the contactor control circuitry 150. That circuitry 150 can include operating logic 152. The operating logic 152 can include standard control logic (e.g., when to open/close the contactor) and can include additional logic that controls operation of the short circuit arc protection circuit discussed further below. The contactor control circuitry 150 can be, for example, in generator/motor control unit, in an inverter control unit, or in a bus power control unit (e.g., in a controller in the panel box 24) to name but a few.

The operating logic 152 can be any hardware of software (or combination thereof) that is used to determine whether a particular contactor should be opened of closed. Determination of whether a particular contactor should be open or closed is performed in controller software or firmware in the logic 152 and can be based on a number of inputs such as generator voltage, bus voltage, TRU voltage depending on the controller type. In the below explanation, the operating logic can receive signal from a sensor that indicates that a short circuit has occurred. The signal can be directly from a sensor 180 (e.g, a current sensor) or from another sensor or controller etc. In the event a short circuit occurs, the contactor actuator 111 moves the bus bar 114 into the second (open) position. Further, it shall be understood that the contactor control circuitry 150 can provide contactor enable signals to additional contactor systems 100. These signals can be provided to a mechanical contactor or can be provided to a solid-state contactor/control element.

As shown more fully below, in addition, the contactor control circuitry 150 will also cause current through the bus bars 106 to cease by mechanically inserting insulated arc prevention elements in the current path. This can prevent arcing between, for example, elements 1061/1141 and 1062/1142 when the contactor 102 opens.

While a mechanical contactor is shown above, the teachings herein can be implemented in the case of a solid-state control element. This is shown, for example, in FIG. 4A/4B discussed below.

Figure 3A:
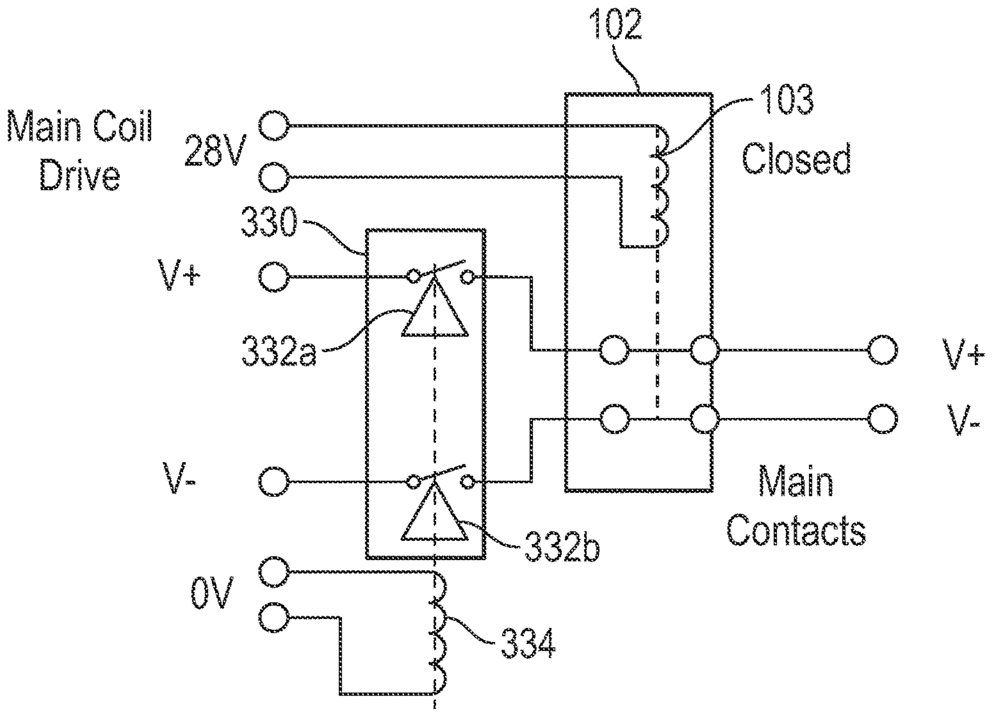
FIGS. 3A-3B show a mechanical contactor in combination with a system according to one embodiment.
Figure 4A:
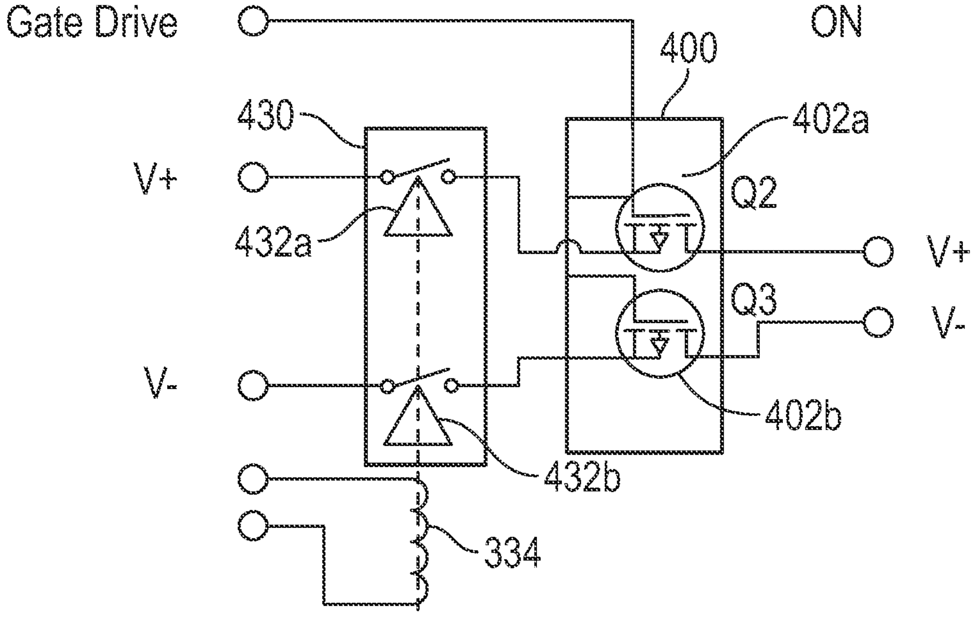
FIGS. 4A-4B show a solid state contactor in combination with a system according to one embodiment.
Figure 4B:
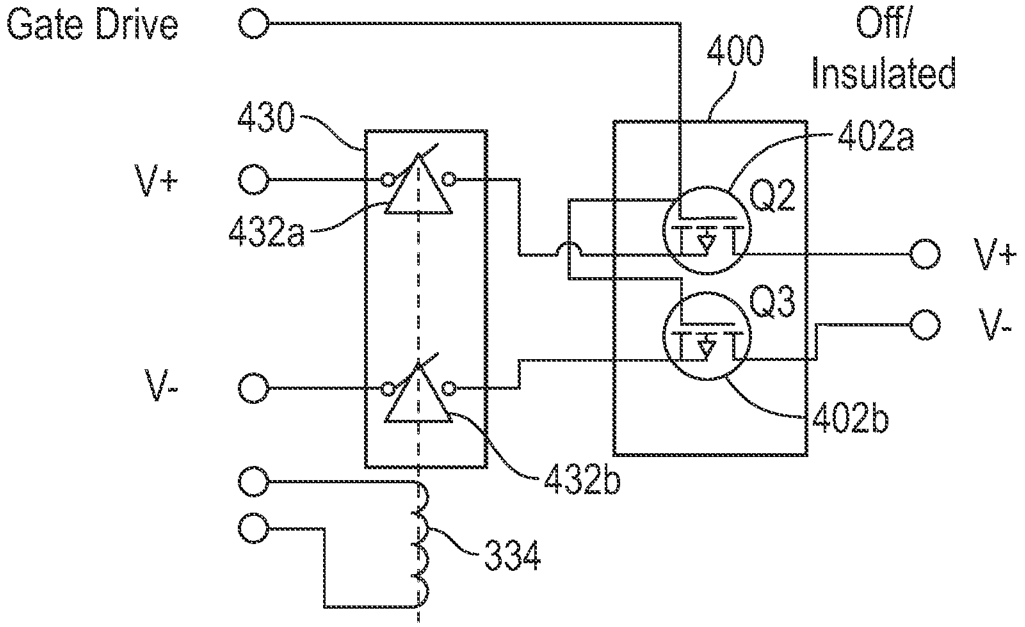

With reference now to FIGS. 3A/3B and 4A/4B, example systems are shown. The system shown in FIGS. 3A/3B can include a mechanical contactor 102. For simplicity, the contactor actuator is assumed to be a solenoid and is shown as a main coil. In FIGS. 4A/4B, rather than including a mechanical contactor, the system includes a solid-state control element 400.

As shown, each system includes two contactors/control elements, one of the main positive line (V+) and one for the main negative line (V−). These are high voltage DC lines (feeders) in one embodiment. As such, the voltage on V+ and V− can be +/−135+/−270 Vdc, +/−400 Vdc or even higher. Indeed, these lines can carry high current in high voltage networks in some cases. The teachings herein apply to all situations but more particularly to high voltage In FIGS. 3A/3B the contactors are mechanical contactors. In FIG. 3A, the contactors are closed. This corresponds to a current being supplied into the coil 103 (e.g., solenoid) of the contactor 102. The coil 103 can be a single coil or a separate coil for each line V+/V−. As shown, the coil 103 is receiving 28V but that is for example only and other voltages could be used. The lines V+/V− can correspond to bus bars 106 or other feeder lines as will be understood by the skilled artisan.

Figure 3B:
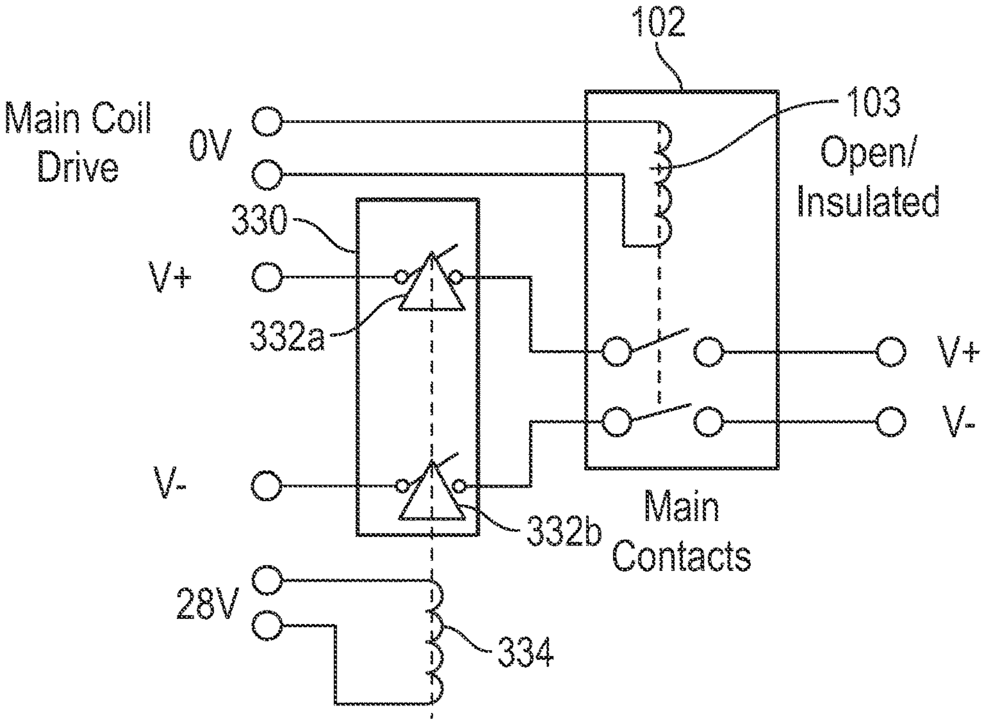

In FIG. 3B, the contactors are open. This corresponds 0V being supplied into the coil 103 (e.g., solenoid) of the contactor 102.

Both FIG. 3A and FIG. 3B include a short circuit arc protection system 330. The system 330 in general, is operated by having insulated arc prevention elements 332*a*/332*b* that are controlled by an arc prevention driver 334 (shown as a coil by way of example). When a short circuit is detected, the system moves from the configuration shown in FIG. 3A to the configuration shown in FIG. 3B. In particular, when a short is detected, the contactor 102 is opened and the insulated arc prevention elements are mechanically interposed to block current/power flow in the main lines V+ and V−. This can achieved, for example, by providing a voltage to the arc prevention driver 334. The actuation driver 334 is shown as a solenoid coil but other types of actuation drive elements such a motor could be used.

In any embodiment herein, the contactor control circuitry 150 of FIG. 2 can provide the voltage to the arc prevention actuation driver 334 or another circuit can provide the signal. Regardless, in one embodiment, the voltage or other signal can be provided to the short circuit arc protection system 330 at the same time or before the contactor enable signal is varied to cause the contactors 102 to open.

As shown in FIGS. 4A/4B, the contactors 102 of FIGS. 3A/3B could be replaced by solid state devices 402 that operate as control elements. In such a case, the short circuit arc protection system 430 in FIGS. 4A/4B can include mechanical contactors that that are disrupted by insulated arc prevention elements 432*a*/432/*b*. The devices allow current to pass when the gate signal is “high” and block it when it passes. However, in the case of a short circuit, these devices can be damaged or may not fully open. As such, the short circuit arc protection system 430 can be used therein as well in the same manner as described above.

Regardless of the form, upon receiving a signal (e.g., a voltage/current) the arc prevention driver 334 will cause one or more insulated arc prevention elements 332*a*, 332*b* to be inserted into the incoming or outgoing power flow so that the power does not pass through the contactors 102 as they are opened in a short circuit situation. Of course, the insulated arc prevention elements 332*a*, 332*b* may be used in other cases (e.g., high current that is not the result of a short) as well.

Figure 5:
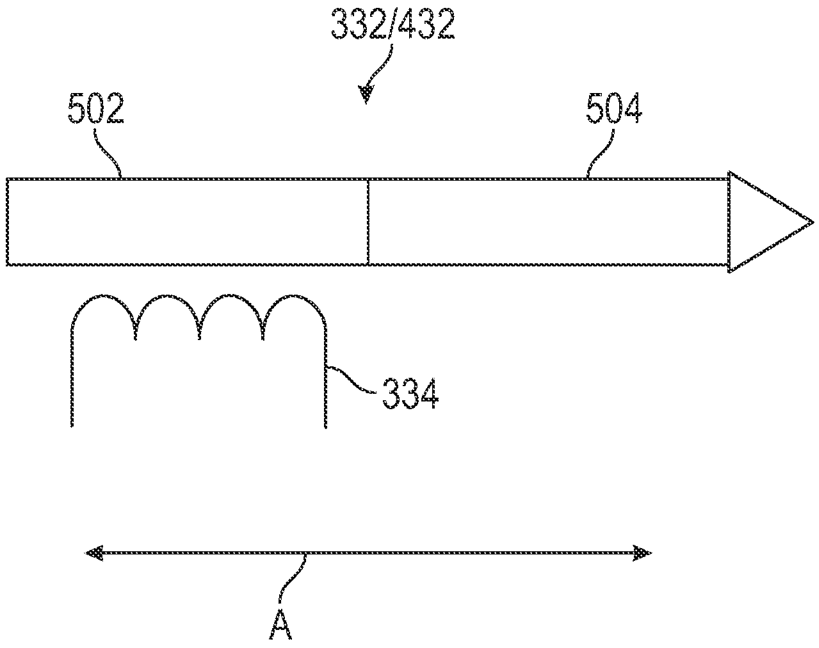
FIG. 5 shows an example, insulated arc prevention element being driven by a coil according to one embodiment.

FIG. 5 shows a simplified block diagram of arc prevention driver 334 in combination with an example insulated arc prevention element 332/432. The insulated arc prevention element 332 includes a metallic shaft 502 and an insulated portion 504. The insulated portion could be formed of a fully insulating or a dielectric material (or as a dielectric coating element surrounding the metallic shaft 502).

As shown, the metallic shaft 502 is adjacent or otherwise in electrical contact (e.g, surround) by the arc prevention driver 334. Application of a voltage across the arc prevention driver 334 will cause an interaction with the shaft 502 that causes the insulated arc prevention element 332 to move. As shown below, this can cause the insulated portion 504 to be disposed between portions of the contactors as they are being opened to reduce arc time or prevent it completely.

Figure 6A:
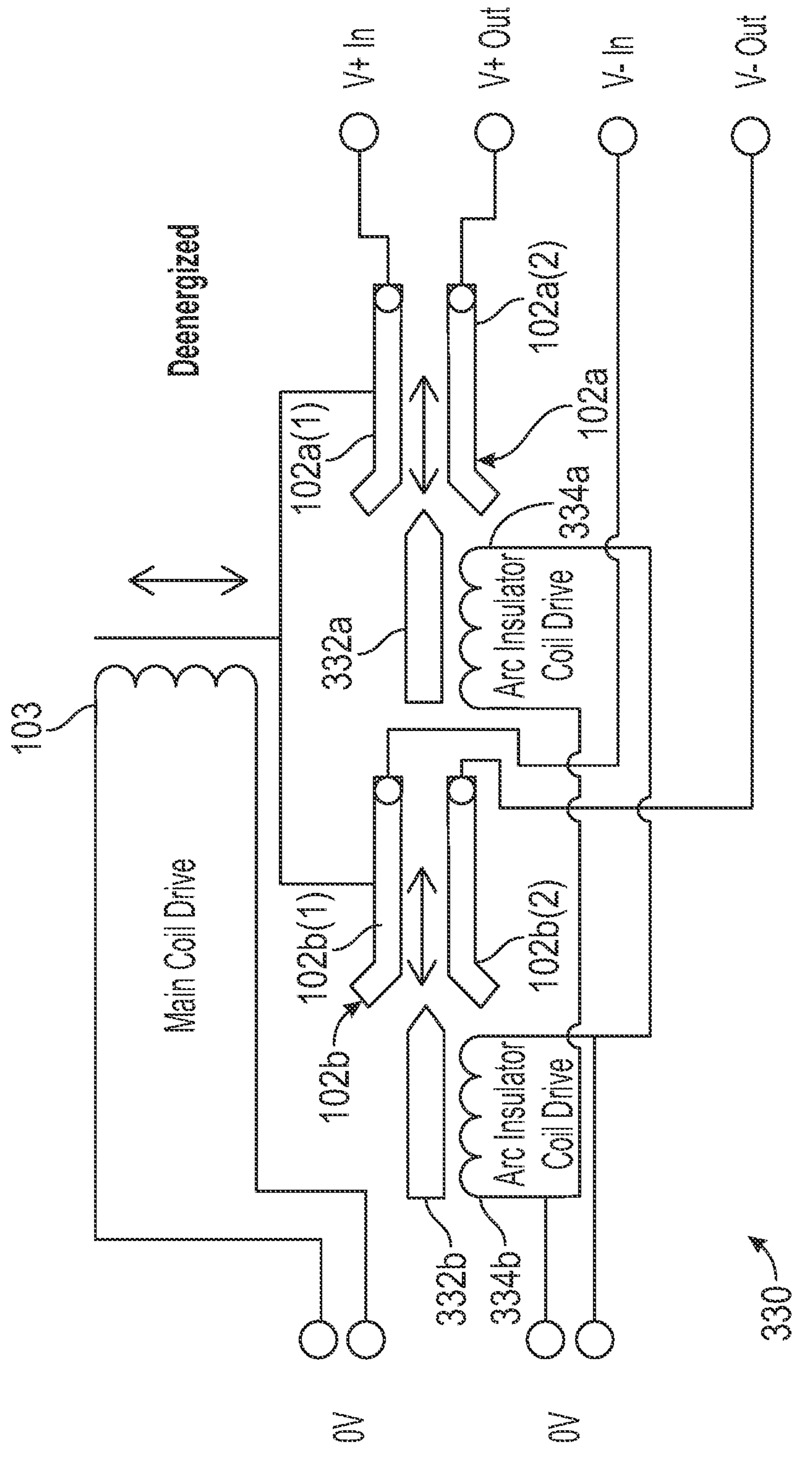
FIGS. 6A-6C show a main contactor in combination with a short circuit arc protection circuit according to one embodiment.
Figure 6B:
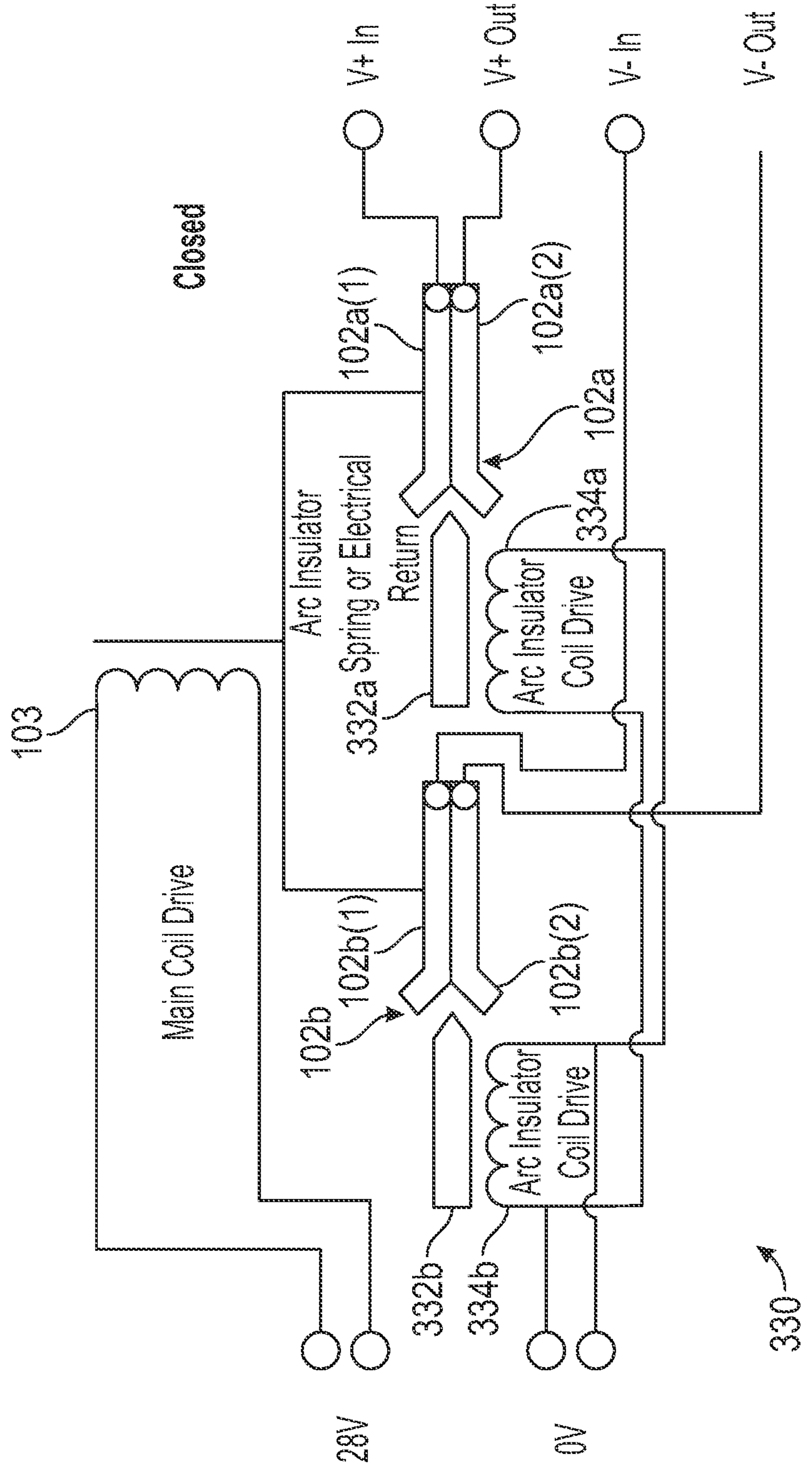
Figure 6C:
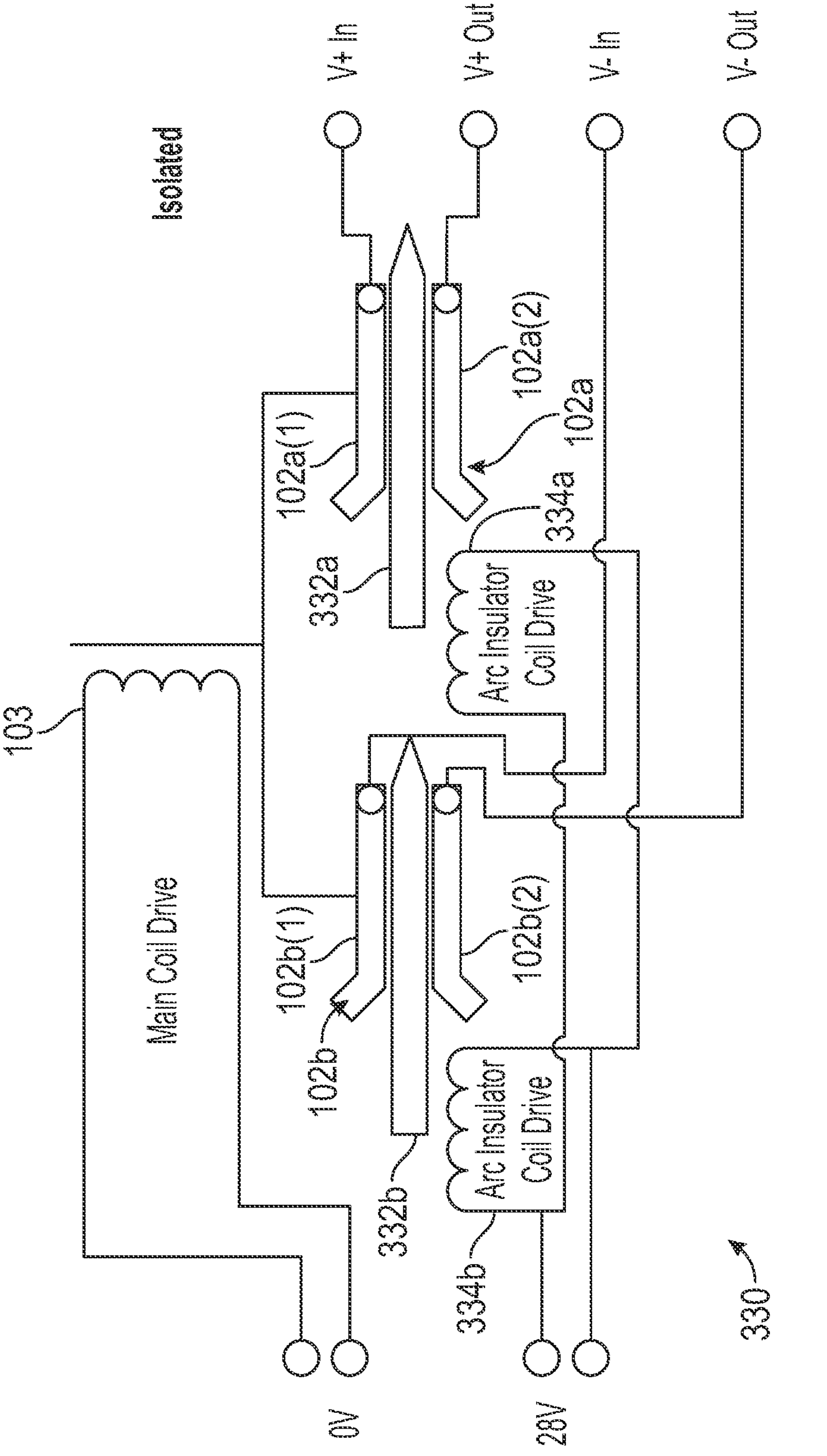

FIGS. 6A-6C, respectively, show an example short circuit protection system 330 in combination with positive and negative contactors 102*a*, 102*b* as the system is de-energized. closed and isolated.

The contactors 102*a*, 102*b* each include a first and second portions that can move relative to one another. As shown, the first or positive contactor 102*a* includes a first portion 102*a* (1) and a second portion 102*a*(2). Similarly, the second or negative contactor 102*b* includes a first portion 102*b*(1) and a second portion 102*b*(2). The first portion and second portion of each contactor 102 can be arranged (e.g., spring loaded) such that when they not receiving a driving current/voltage, the portions are separated and do not pass power/current. This is shown in FIG. 6A.

As shown in FIG. 6B, upon application of voltage (e.g, 28V) to the main coil 103, the contactors 102*a*, 102*b* close and power can pass through them. The system 330 includes the first and second arc prevention driver 334*a*, 334*b* that, respectively, drive insulated arc prevention elements 332*a*, 332*b*.

As shown in FIG. 6C, upon application of voltage (e.g., 28V) to first and second arc prevention drivers 334*a*, 334*b*, the insulated arc prevention elements 332*a*, 332*b* move to the right. This movement coincides (e.g., either before, during or after) the voltage applied to the main coil 103 has been removed. As the voltage is removed from the main coil 103, the contactors 102*a*, 102*b* open and the insulated arc prevention elements 332*a*, 332*b* moved between the portions of their respective contactors 102*a*, 102*b* such that the dielectric portion of the insulated arc prevention elements 332*a*, 332*b* is between the portions and thereby prevents or stops arcing between them.

The application of the voltage to the first and second arc prevention driver 334*a*, 334*b* can occur when the contactor control circuitry 150 receives an indication (e.g., sensor signal) that a short has occurred as illustrated in FIG. 2. This indication can be sensor reading or a determination based on the sensor reading and can be made in the contactor control circuitry 150 or at another location (e.g., generator controller, bus power controller, etc.).

In another embodiment, the systems shown in FIGS. 6A-6C could be self-contained systems. That is, the short circuit protection system 430 could include the contactors 102 and the system could further include the solid state switches shown in FIGS. 4A/4B. These switches could be located, for example on any of V+In/V+out/V−In/V−out. This is shown, for example, in FIG. 7

Figure 7:
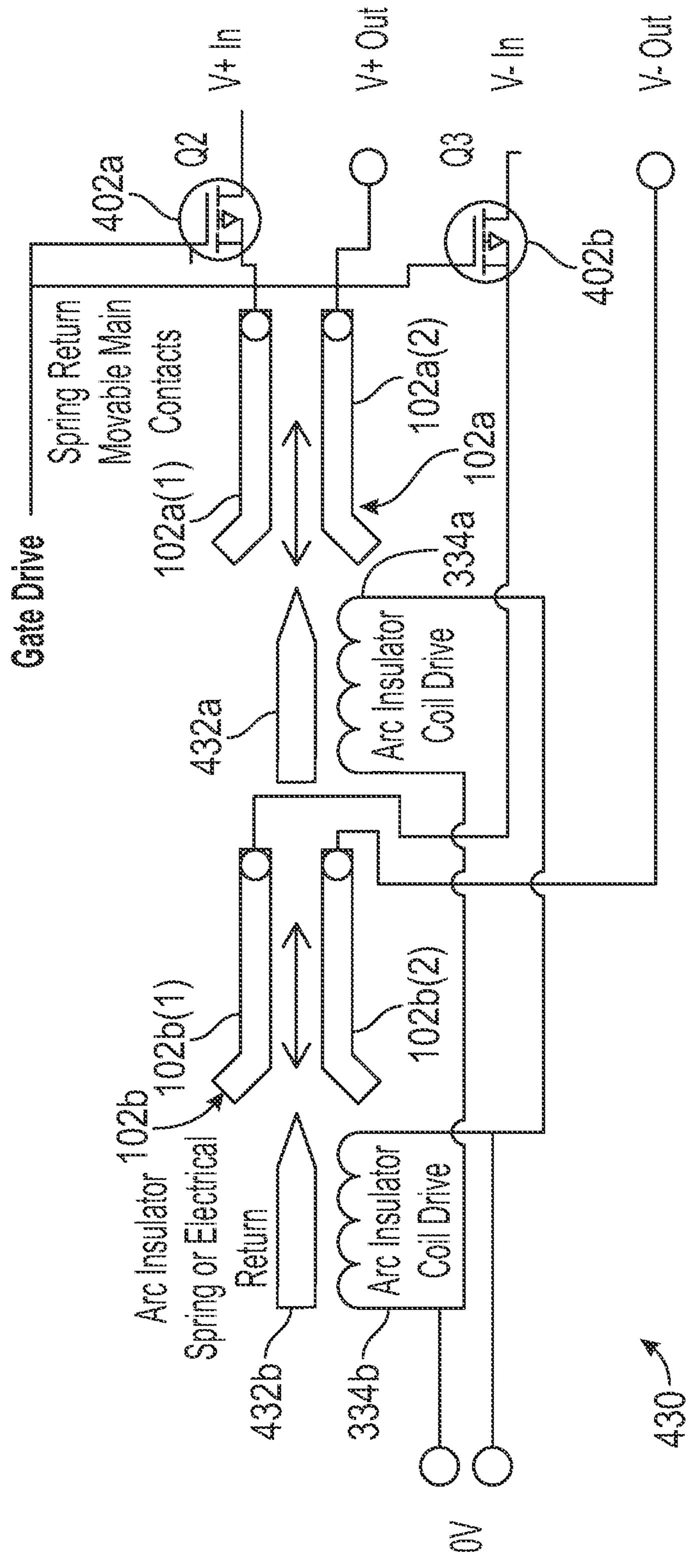
FIG. 7 shows an alternative embodiment of a main contactor/controller in combination with a short circuit arc protection circuit according to one embodiment.

In more detail, FIG. 7 shows an example short circuit protection system 430 in combination with positive and negative control elements 402*a*, 402*b*. The control elements 402*a*, 402*b* serve as the primary means/elements of allowing current to flow from V+in to V+out and from V−in to V−out. In this embodiment, the contactors 102*a*/102*b* are part of the short circuit protection system 430. In the illustrated embodiment, the contactors 102*a*/102*b* are spring loaded (closed) and are not controlled by a coil as described above but they could be if desired.

The contactors 102*a*, 102*b* each include a first and second portions that can move relative to one another. As shown, the first or positive contactor 102*a* includes a first portion 102*a*(1) and a second portion 102*a*(2). Similarly, the second or negative contactor 102*b* includes a first portion 102*b*(1) and a second portion 102*b*(2).

In the event that a short circuit is detected, the gate drive signal can be set to the appropriate level so that the control elements 402*a*, 402*b* become non-conductive.

In a manner similar to the above, upon application of voltage (e.g., 28V) to first and second arc prevention drivers 434*a*, 434*b*, the insulated arc prevention elements 432*a*, 432*b* move to the right so they are disposed between the portions of the contactors 102 such that the dielectric portion of the insulated arc prevention elements 432*a*, 432*b* is between the portions and thereby prevents or stops arcing between them.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A high voltage DC contactor control system comprising:

a first contactor configured to be connected to a positive feeder line, the first contactor being controlled by a drive voltage and having a first portion and a second portion that when in contact allow current to flow between them;

a short circuit protection system operably connected to the drive voltage configured to reducing arcing between portions of the first contactor, the short circuit protection system comprising:

a first arc prevention element; and a first arc prevention driver configured to cause the first arc prevention element to be disposed between the first and second portions of the first contactor to prevent arcing between them;

the high voltage DC contactor control system further comprising a sensor to sense a short circuit; and a contactor controller configured to control operation of the first contactor and the short circuit protection system;

wherein the contactor controller is configured, in the event of a short circuit, to cause the first contactor to open by removing the drive voltage from first contactor and to cause the short circuit protection supply system to move the first arc prevention element between the first and second portions by providing the drive voltage to it.

2. The high voltage DC contactor control system of claim 1, wherein the contractor controller is configured to cause the first arc prevention element to begin moving at the same time as or before the first contactor begins opening.

3. The high voltage DC contactor control system of claim 1, wherein the first arc prevention driver is a coil.

4. The high voltage DC contactor control system of claim 3, wherein the first arc prevention element includes a metallic portion and an insulating portion and the first arc prevention driver is configured to electrically interact with the metallic portion to cause the insulation portion to move between the first and second portion of the contactor.

5. The high voltage DC contactor control system of claim 4, wherein the insulating portion is formed of a dielectric material.

6. The high voltage DC contactor control system of claim 1, further comprising:

a second contactor connected to a negative feeder line, the second contactor being controlled by the drive voltage and having a first portion and a second portion that when contacting allow current to flow between them;

and wherein the short circuit protection system further includes:

a second arc prevention element; and a second arc prevention driver configured to cause the second arc prevention element to be disposed between the first and second portions of the second contactor to prevent arcing between them.

7. A method of controlling a DC contactor, the method comprising:

determining that a short circuit exists on a positive feeder line;

opening a first contactor connected to the positive feeder line, the first contactor being controlled by a drive voltage and having a first portion and a second portion that when contacting allow current to flow between them, wherein opening includes removing the drive voltage from the first contactor; and moving a first arc prevention element between the first and second portions of the first contactor to prevent arcing between them, wherein moving the first arc protection element includes providing the drive voltage to a first arc prevention driver that control the first arc protection element.

8. The method of claim 7, wherein a contactor controller controls operation of the first contactor and the first arc prevention driver based on the determination that the short circuit exists.

9. The method of claim 7, wherein the first arc prevention driver is a coil.

10. The method of claim 9, wherein the first arc prevention element includes a metallic portion and an insulating portion and the first arc prevention driver electrically interacts with the metallic portion to cause the insulation portion to move between the first and second portion of the contactor.

11. The method of claim 10, wherein the insulating portion is formed of a dielectric material.

12. A high voltage DC contactor control system comprising:

a control element configured to be connected to a positive feeder line to control power through the positive feeder line;

a short circuit protection system operably connected to a drive voltage and configured to reducing arcing between portions of the first contactor, the short circuit protection system comprising:

a first contactor configured to be connected to a positive feeder line, the first contactor configured to be controlled by the drive voltage and having a first portion and a second portion that when in contact allow current to flow between them;

a first arc prevention element; and a first arc prevention driver configured to cause the first arc prevention element to be disposed between the first and second portions of the first contactor to prevent arcing between them;

the high voltage DC contactor control system further comprising a sensor to sense a short circuit; and a contactor controller configured to apply the drive voltage which causes the first arc prevention element to move between the first and second positions when a short circuit is sensed.

13. The high voltage DC contactor control system of claim 12, wherein the contractor controller is configured to cause the control element to become non-conductive in the event of a short circuit.

14. The high voltage DC contactor control system of claim 13, wherein first arc prevention element is configured to begin moving as or before the first contactor begins opening.

* * * * *